US009429086B2

United States Patent
Ono et al.

(10) Patent No.: US 9,429,086 B2
(45) Date of Patent: Aug. 30, 2016

(54) ENGINE CONTROL DEVICE AND COGENERATION APPARATUS EMPLOYING THE ENGINE CONTROL DEVICE

(75) Inventors: Yasuhide Ono, Wako (JP); Yoichi Yamamura, Wako (JP); Koji Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 13/344,118

(22) Filed: Jan. 5, 2012

(65) Prior Publication Data
US 2012/0197514 A1 Aug. 2, 2012

(30) Foreign Application Priority Data

Jan. 27, 2011 (JP) .................................. 2011-015393

(51) Int. Cl.
*F02N 11/08* (2006.01)
*F02D 41/00* (2006.01)
*F02D 41/06* (2006.01)
(Continued)

(52) U.S. Cl.
CPC .......... *F02D 41/0027* (2013.01); *F02D 19/023* (2013.01); *F02D 41/062* (2013.01); *F02M 21/0239* (2013.01); *F02M 21/047* (2013.01); *Y02T 10/32* (2013.01)

(58) Field of Classification Search
CPC ............... F02D 41/062; F02D 19/023; F02D 2200/0614; F02D 41/064; F02D 41/065; F02N 11/0848; F02M 21/042; F02M 21/045; F02M 21/047

USPC ............. 701/113; 123/179.16, 525, 527, 491
See application file for complete search history.

(56) References Cited

U.S. PATENT DOCUMENTS 4,276,238 A * 6/1981 Yoshikawa et al. ......... 261/39.5
4,419,972 A * 12/1983 Hattori et al. ................ 123/337
(Continued)

FOREIGN PATENT DOCUMENTS

EP          1223326          7/2002
EP          2141351 A1 *     1/2010
(Continued)

OTHER PUBLICATIONS

European Patent Office Summons to Attend Oral Proceedings dated Apr. 29, 2016, Application No. 11196206.4.

*Primary Examiner* — Hung Q Nguyen
*Assistant Examiner* — Josh Campbell
(74) *Attorney, Agent, or Firm* — Rankin, Hill & Clark LLP

(57) ABSTRACT

A control section starts cranking of an engine with a first opening degree upon detection of a first operation signal, and, if the engine has reached a predetermined number of rotations through a predetermined number of times of the cranking with the first opening degree, the control section starts running of the engine in a first mode corresponding to the first opening degree. If the engine has not reached the predetermined number of rotations through the predetermined number of times of the cranking with the first opening degree, the control section starts cranking with a second opening degree, and, if the engine has reached the predetermined number of rotations through the predetermined number of times of the cranking with the second opening degree, the control section starts running of the engine in a second mode corresponding to the second opening degree.

16 Claims, 7 Drawing Sheets

(51) Int. Cl.
  *F02M 21/02* (2006.01)
  *F02D 19/02* (2006.01)
  *F02M 21/04* (2006.01)

(56) References Cited

U.S. PATENT DOCUMENTS

| | | | | | |
|---|---|---|---|---|---|
| 4,694,811 | A | * | 9/1987 | Bennett | F02B 43/00 123/27 GE |
| 5,191,531 | A | * | 3/1993 | Kurosu et al. | 701/103 |
| 5,554,322 | A | * | 9/1996 | Kobayashi | 261/35 |
| 6,000,369 | A | * | 12/1999 | Koizumi | 123/179.16 |
| 6,286,316 | B1 | * | 9/2001 | Waldrop | B01D 5/0039 60/659 |
| 6,293,524 | B1 | * | 9/2001 | Endo et al. | 261/34.2 |
| 7,216,856 | B2 | * | 5/2007 | Iwasa et al. | 261/34.2 |
| 2004/0118385 | A1 | * | 6/2004 | Katoh et al. | 123/491 |
| 2008/0190400 | A1 | * | 8/2008 | Bushnell | F02D 41/003 123/527 |
| 2008/0196488 | A1 | * | 8/2008 | Bauer et al. | 73/114.53 |
| 2008/0196691 | A1 | * | 8/2008 | Kihara et al. | 123/299 |
| 2009/0076709 | A1 | * | 3/2009 | Shiraishi et al. | 701/103 |
| 2009/0199813 | A1 | * | 8/2009 | Kuzuyama et al. | 123/27 R |
| 2009/0206599 | A1 | | 8/2009 | Yamamura et al. | |

FOREIGN PATENT DOCUMENTS

| | | | |
|---|---|---|---|
| FR | 2817589 | | 6/2002 |
| JP | 60073028 A | * | 4/1985 |
| JP | 60-159371 A | * | 8/1985 |
| JP | 60159371 A | * | 8/1985 |
| JP | 08-042400 | | 2/1996 |
| JP | 09-112353 | | 4/1997 |
| JP | 09112353 A | * | 4/1997 |
| JP | 2001-200760 | | 7/2001 |

* cited by examiner

FULLY CLOSED

50% OPEN
(NO. OF STEPS a)

70% OPEN
(NO. OF STEPS b)

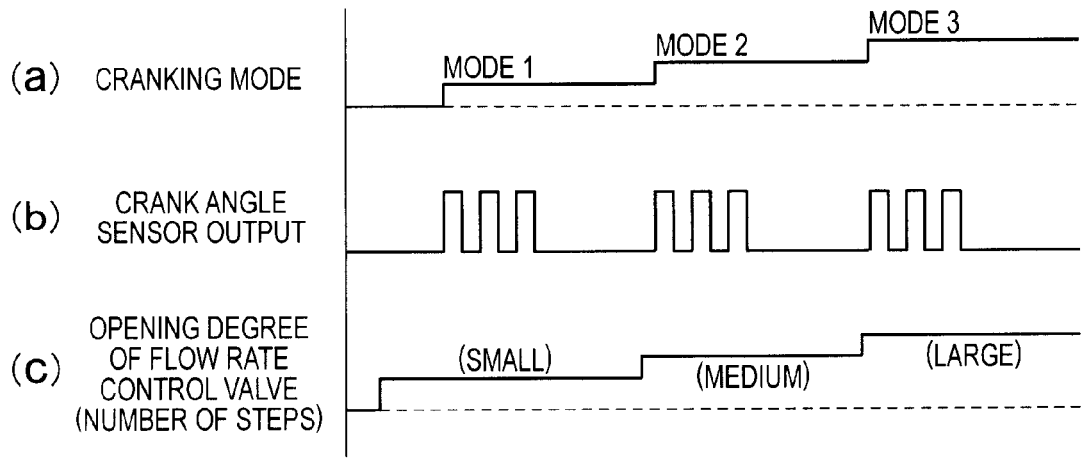
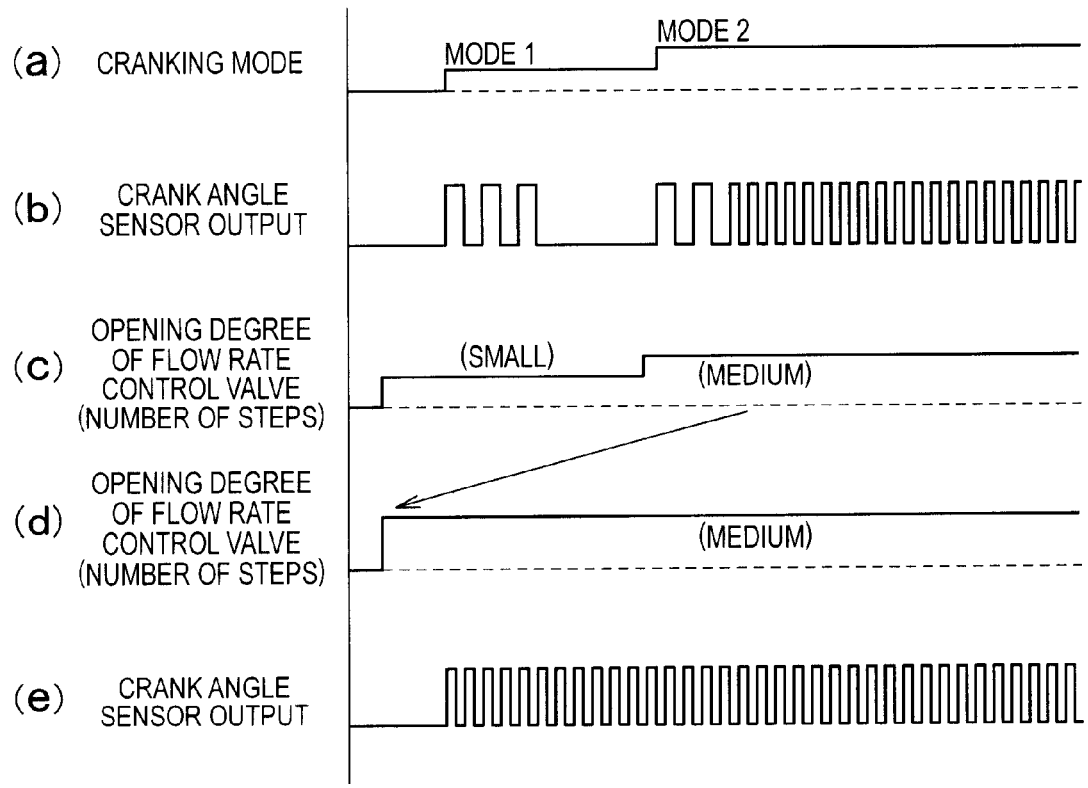

ENGINE CONTROL DEVICE AND COGENERATION APPARATUS EMPLOYING THE ENGINE CONTROL DEVICE

FIELD OF THE INVENTION

The present invention relates to a gas engine control device, and a cogeneration apparatus which is provided with such a gas engine control device and suited for use as a home-use cogeneration apparatus.

BACKGROUND OF THE INVENTION

In recent years, home-use cogeneration apparatus have become popularly known which are constructed to not only supply electric power (electric) energy, generated by a power generator unit, to an electric load in conjunction with a commercial power system but also supply hot water (heat energy) or the like, generated using exhaust heat of an internal combustion engine, to a heat load.

In many home-use cogeneration apparatus, a gas engine is incorporated because gas is used as fuel. Basic principles of such a gas engine control device for controlling starting (activation) of the gas engine are disclosed in detail, for example, in Japanese Patent Application Laid-Open Publication No. HEI-08-42400.

In the gas engine, where rotational force is generated by explosion of a mixture of gas and air (i.e., air-fuel mixture), a crankshaft has to be rotated to cause such explosion. In order for the engine to shift from a non-running state to a running state in which the engine continues complete explosion of the air-fuel mixture, the air-fuel mixture must be exploded first by the crankshaft being rotated by some external means. The engine control device controls starting of the engine by so-called "cranking" indented to drive the crankshaft from the non-operating state via a starter motor.

As well known, a variety of gases are available as fuel today; in this country, for example, 13 types (seven groups) of town gases and types of LP gas are available, and the types of gases to be used are predetermined for individual pieces of equipment. An amount of generatable heat greatly differs not only among the types but also among groups even for a same type, and thus, if the number of types and groups of gasses (hereinafter also referred to simply as "gas types") suited for the gas engine increases, appropriate starting of the engine may become difficult due to a cranking failure depending on the gas type used.

SUMMARY OF THE INVENTION

In view of the foregoing prior art problems, it is an object of the present invention to provide an improved engine control device which can facilitate starting of a gas engine even where different gas types are used, or without depending on a particular gas type, and a cogeneration apparatus including such an engine control device.

In order to accomplish the above-mentioned object, the present invention provides an improved engine control device for controlling starting of an engine, which comprises: a flow rate control valve which adjusts, in accordance with a set opening degree, a flow rate of gas to be supplied to the engine; and a control section which performs control to start, upon detection of a first operation signal, a predetermined number of times or less of cranking with a first opening degree in accordance with the first operation signal, and start, if a number of rotations of the engine has not yet reached a predetermined value through the cranking, the predetermined number of times or less of cranking with a second opening degree. By changing the opening degree of the flow rate control valve (fuel flow rate control valve) in a progressive manner as noted above, the engine control device of the present invention permits appropriate starting of the engine even where different gas types are used or without depending on a particular gas type.

In one embodiment, the engine control device of the present invention further comprises a storage section, and, when the number of rotations of the engine has reached the predetermined value through the predetermined number of times or less of cranking with the first or second opening degree, the control section stores into the storage section a first or second mode corresponding to the first or second opening degree. By thus retaining in the storage section the first mode or second mode in which the rotations of the engine reached the reference value, next staring of the engine can be controlled appropriately in accordance with the stored mode. As a result, the next time the engine is to be started, the engine can be started at an earlier time, and a wait time required before the engine starting can be reduced so that output of the engine can be supplied to a load at an earlier time.

In one embodiment, upon detection of a second operation signal while the first mode is retained in the storage section, the control section starts the cranking with the first opening degree in accordance with the second operation signal. Such an arrangement can reduce the number of trials or attempts of cranking in the second mode and thereby reduce the time necessary for the starting of the engine.

In one embodiment, upon detection of a second operation signal while the second mode is retained in the storage section, the control section starts the cranking with the second opening degree in accordance with the second operation signal. Such an arrangement can reduce the number of trials or attempts of cranking in the first mode and thereby reduce the time necessary for the starting of the engine.

In one embodiment, the engine control device of the present invention further comprises an informing section, and, when the number of rotations of the engine has not reached the predetermined value through the predetermined number of times or less cranking performed in each of the first and second modes, the control section informs of a cranking failure by means of an informing section. Because the control section informs of a cranking failure by means of the informing section as noted above, a human operator can recognize a failure of starting of the engine.

According to another aspect of the present invention, there is provided an improved cogeneration apparatus including the aforementioned engine control device. By applying, to the cogeneration apparatus, the engine control device that permits appropriate starting of the engine even where different gas types are used or without depending on a particular gas type, the present invention can not only supply electric power, generated in a power generator unit, to a electric load in conjunction with a commercial power system, but also supply hot water or the like, produced using exhaust gas of the engine, to a heat load.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 4 is a time chart illustrating a behavior of the engine control device, provided in the cogeneration apparatus, when starting of an engine by cranking has failed;

FIG. 5 is a time chart illustrating a behavior of the engine control device when the starting of the engine by cranking has succeed;

DETAILED DESCRIPTION OF THE PREFERRED EMBODIMENTS

Figure 1:
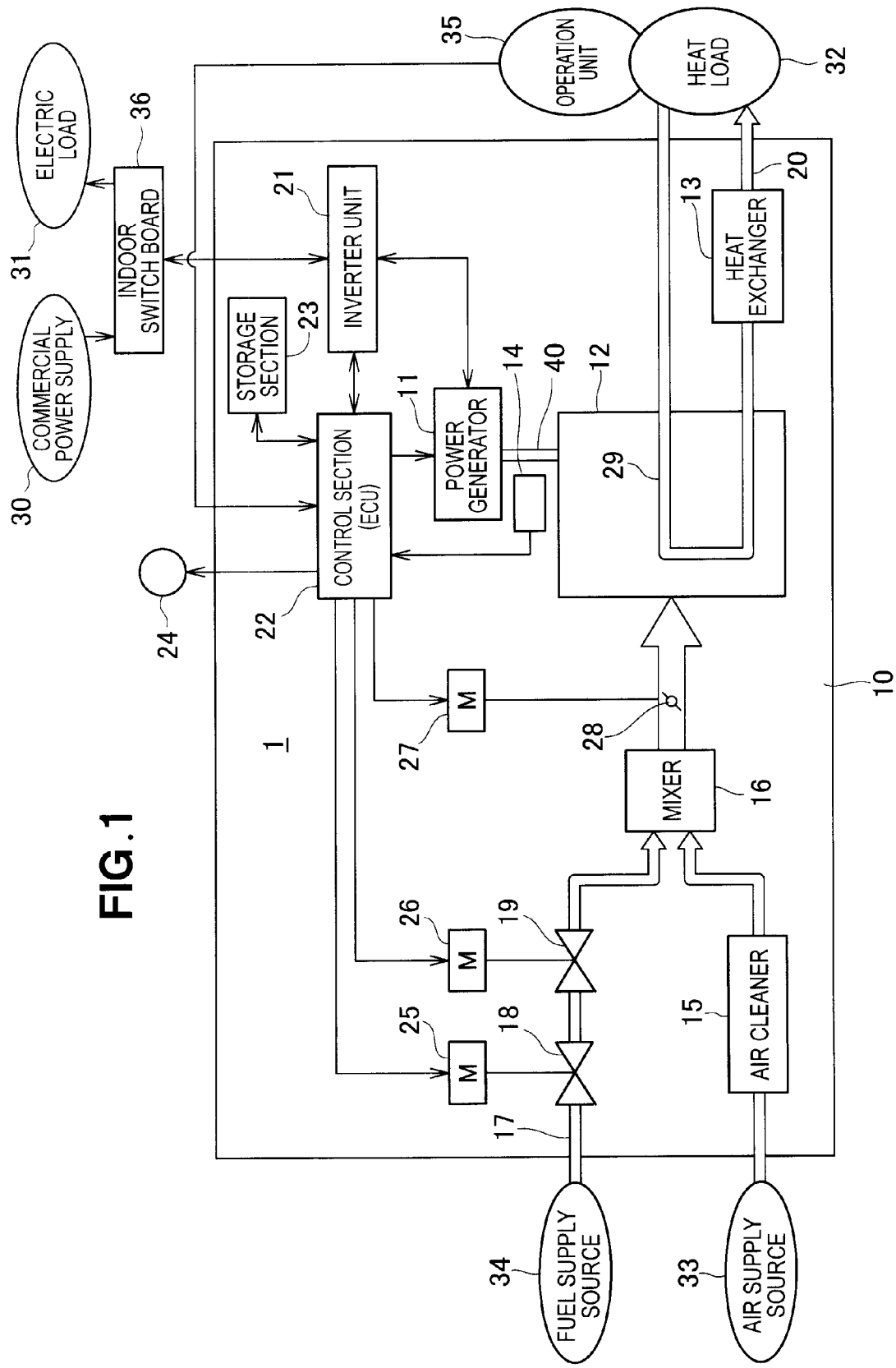
FIG. 1 is a block diagram illustrating an overall construction of a cogeneration apparatus employing an engine control device according to an embodiment of the present invention.

Reference is now made to FIG. 1 illustrating in block diagram an overall construction of an embodiment of a cogeneration apparatus of the present invention. The "cogeneration", which is also called "combined heat and power", means one of new energy supply systems for acquiring power, heat energy and cold energy using exhaust heat of an internal combustion engine, external combustion engine or the like.

<Construction of the Cogeneration Apparatus>

The embodiment of the cogeneration apparatus 10 includes, as its main components, an engine control device 1, a power generator (starter/generator) 11 connectable to an AC power feed path extending from a commercial power supply (commercial power system) 30 to an electric load 31, an engine 12 for driving the power generator 11, and a heat exchanger 13 for effecting heat exchange between cooling water of an engine 12 and exhaust heat to thereby raise the temperature of the cooling water. The heat exchanger 13 is connected to a heat load 32, such as an exhaust-gas-using, hot-water-supplying heating unit, which is supplied with the cooling water, having the temperature raised by the heat exchanger 13, to produce hot water and the like.

The control device 1 for controlling starting of the engine 12 includes, among others: a flow rate control value 19; a control section 22; a storage section 23; and an informing section 24.

The commercial power supply 30 outputs AC power of 50 Hz (or 60 Hz) with AC 100 or 200 volt voltage via a single-phase three-wire system. The power generator 11 and the engine 12 are accommodated within a casing of the cogeneration apparatus 10 together with the heat exchanger 13.

The engine 12 is a spark-ignition engine of a water-cooling, four-cycle, single-cylinder OHV (Overhead Valve) type, and it has a displacement of, for example, 163 cc. A cylinder head and cylinder block (not shown) incorporated in the engine 12 are oriented horizontally or transversely, within which a single piston (not shown) is reciprocally movably provided. A vertical crankshaft 40 is connected to the piston, and a crank angle sensor 14 is provided near the crankshaft 40.

The power generator 11 includes a multi-pole coil and is fixed on a crankcase disposed inside a flywheel provided at the upper end of the crankshaft 40. As the power generator 11 rotates relative to the flywheel, it generates AC power. When energized by the commercial power supply 30 (or not-shown battery), the power generator 11 functions also as a starter motor for cranking the engine 12.

Air output from an air supply source 33 is supplied to a mixer 16 via an air cleaner 15 while gas output from a gas supply source 34 is supplied to the mixer 16 via a gas supply pipe or path 17, shut-off valve 18 and flow rate control valve 19, so that the supplied air and gas is mixed together by the mixer. In this way, the mixer 16 produces a fuel-air mixture.

The fuel-air mixture produced by the mixer 16 flows into a combustion chamber (not shown) within the engine 12. A not-shown ignition plug is provided near the combustion chamber. Once output of a not-shown battery is supplied to the ignition plug via an ignition device comprising a power transistor, ignition coil etc., spark discharge occurs between electrodes facing the combustion chamber so that the fuel-air mixture is ignited and burned. Resultant exhaust gas is output from the engine 12 and then discharged to outside the casing through an exhaust pipe or path 20 connected to the engine 12 via the heat exchanger 13.

Output of the power generator 11 is sent to an inverter unit 21, which converts the output of the power generator 11 into AC 100/200 volts (single phase). In response to an instruction given from the control section 22 in the form of an ECU (Electronic Control Unit), the inverter unit 21 switches the power generator 11 between a starter function and a power generator function. An operation unit 35 of the heat load 32 is connected to the control section 22. Also connected to the control section 22 are the storage section 23, informing section 24 and electric motors 25 to 27. The electric motor 25 drives the shut-off valve 18, the electric motor 26 drives the flow rate control valve 19, and the electric motor 27 drives a throttle valve 28 incorporated in the mixer 16.

By controlling the electric motors 25 to 27 on the basis of information input via the operation unit 35 and information input via various sensors, such as the crank angle sensor 14, the control section 22 controls the shut-off valve 18, flow rate control valve 19 and throttle valve 28 to thereby control starting and running of the engine 12.

Further, upon detection of a first operation signal (engine start request), the control section 22 starts a predetermined number of times or less of cranking with a first opening degree. If the number of rotations of the engine 12 has not yet reached a predetermined reference value (i.e., idling rotations), then the control section 22 starts a predetermined number of times or less of cranking with a second opening degree.

Further, when the number of rotations of the engine 12 through the predetermined number of times or less of cranking with the first opening degree or second opening degree has reached a predetermined reference value, the control section 22 stores, into the storage section 23, a first or second mode (i.e., first or second cranking mode) corresponding to the first or second opening degree. Upon detection of a second operation signal (next engine start request) while the first mode is stored retained in the storage section 23, the control section 22 starts cranking with the first opening degree of the flow rate control valve 19 in response to the second operation signal. Upon detection of the second operation signal (next engine start request) while the second mode is stored or retained in the storage section 23, the control section 22 starts cranking with the second opening degree of the flow rate control valve 19 in response to the second operation signal.

Furthermore, if the number of rotations of the engine 12 through the predetermined number of times or less of cranking in each of the first and second modes has not reached the respective reference value, the control section 22 performs control to inform of a cranking failure by means of the informing section 24.

The term "opening degree" is used herein to refer to an area of an opening 19g (i.e., opening area) defined between a needle 19e and an orifice 19f of a needle valve assembly used as the flow rate control valve 19, as seen in FIGS. 3A-3D. The opening area is variably set by the control section 22 controlling the number of steps of a step motor 19a that drives vertical (or up-down) movement of the needle 19e. Namely, the control section 22 is constructed to attempt starting of the engine 12 with a plurality of cranking with the first opening degree a, and further attempt starting of the engine 12 with a plurality of times of cranking with the second opening degree b if a predetermined idling engine speed has not yet reached through the cranking with the first opening degree a. For example, if an opening time of the shut-off valve 18 is set at 75 sec or below, three sets of three eight-sec cranking (i.e., cranking for a total of 72 sec) are possible. Further, the term "mode" is used herein to refer to a set of a plurality of times of cranking (e.g., three times of cranking) performed for each of the set opening degrees.

Output of the inverter unit 21 is sent to an indoor switchboard 36. The indoor switchboard 36 includes, among others: a master breaker for preventing energization of overcurrent etc.; a distribution switchboard for supplying a combination of the output of the inverter unit 21 and electric power of the commercial power supply 30 to the electric load 31; a dedicated breaker for the power generator 11; and a current sensor provided on a power feed path, extending from the commercial power supply 30 to the master breaker, for generating a signal corresponding to an AC current flowing in and along the power feed path. Namely, the output of the inverter unit 21 is combined with the electric power of the commercial power supply 30 and then supplied to the electric load 31 by means of the indoor switchboard 36.

The output of the inverter unit 21 is connectable via the indoor switchboard 36 to the power feed path extending from the commercial power supply 30 to the electric load 31. Note that generated power output (i.e., rated power) of the power generator 11 is about 1.0 kW.

Reference numeral 29 indicates a path of cooling water (antifreeze liquid) for cooling the engine 12 (hereinafter referred to as "cooling water path"). The cooling water path 29 passes through the cylinder block and oil tank of the engine 12 and the heat exchanger 13 and is then connected to the heat load 32. In the heat exchanger 13, the cooling water is heat-exchanged with exhaust gas so that it is raised in temperature. The heat exchanger 13 is constructed, for example, by deforming the cooling water path 29 so as to cover the exhaust path 20. The cooling water having passed through the heat exchanger 13 is supplied to a cylinder passage, formed in the cylinder block and cylinder head, so that it is heat-exchanged with the engine 12 to thereby cool the engine 12. The cooling water, having been resized in temperature through the heat exchange with the exhaust and engine 12, flows in and along the cooling water path 29 to be returned back to the heat load 32 through the casing of the cogeneration apparatus 10.

<Construction of the Flow Rate Control Valve>

Figure 2:
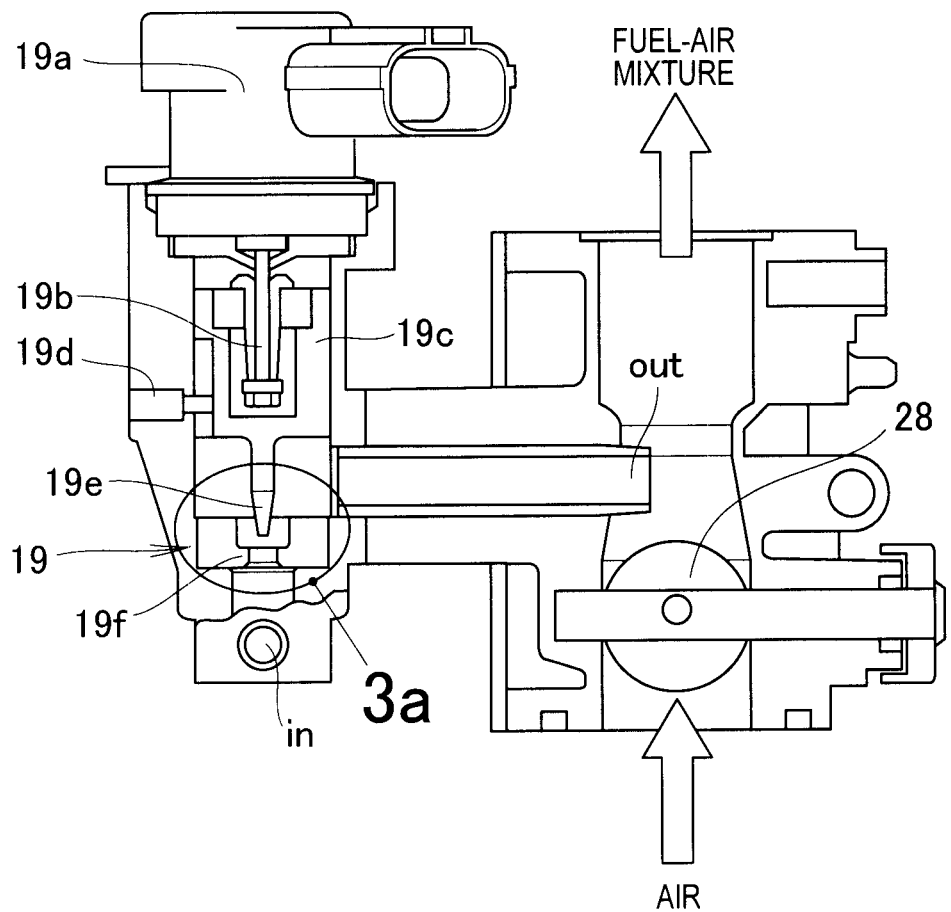
FIG. 2 is a schematic view illustrating a mechanism of a flow rate control valve shown in FIG. 1

FIG. 2 shows a sectional construction of the needle valve assembly used as the flow rate control valve 19 in the embodiment of the engine control device 1. The needle valve assembly includes a step motor 19a, rotation shaft 19b, plunger 19c, stopper 19d, needle 19e and orifice 19f. Rotation of the step motor 19a is converted into linear vertical movement by the plunger 19c. Namely, rotation of a lead screw provided on a motor shaft 19b of the step motor 19a is converted into linear movement by the stopper 19d mounted in such a manner as to inhibit relative rotation and axial movement of the plunger 19c having a cylindrical nut on its inner wall. The step motor 19a shown in FIG. 2 corresponds to the electric motor 26 of FIG. 1.

The control section 22 adjusts a gas flow rate flowing in the gas supply pipe or path 17, by controlling the area (hereinafter "opening degree") of the opening 19g defined between the orifice 19f and the needle 19e disposed at the distal end of the plunger 19c and operating in response to the reciprocal movement of the plunger 19c. More specifically, FIGS. 3B, 3C and 3D are each a sectional view of a needle valve body, comprising the needle 19e and orifice 19f, taken along the c-c line of FIG. 3A.

Figure 3A:
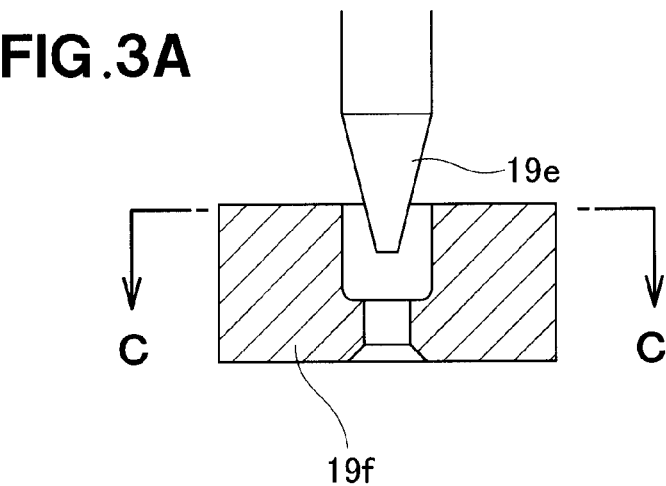
FIGS. 3A to 3D are sectional views showing an opening in the flow rate control valve of FIG. 2.
Figure 3B:
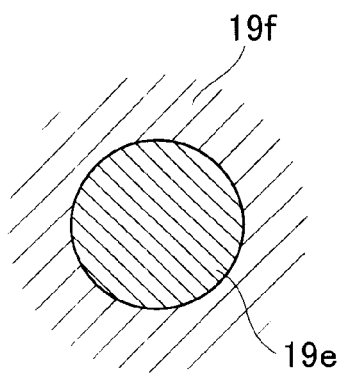
Figure 3C:
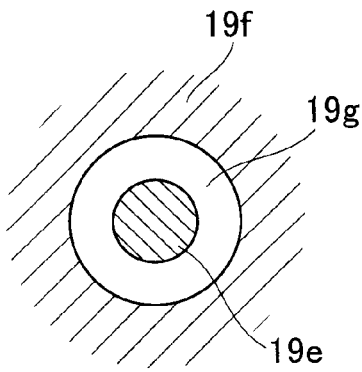
Figure 3D:
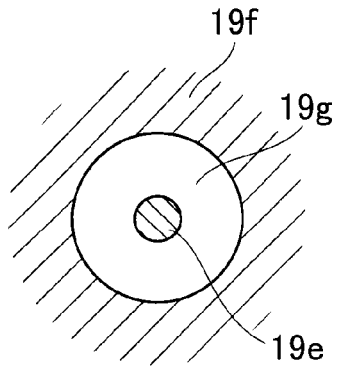

Using, as a reference, zero step of the step motor 19a in a fully-closed valve state where the surface of the needle 19e and the seating surface of the orifice 19f are in contact with each other as shown in FIG. 3B, control is performed such that the opening degree when the number of steps supplied to the step motor 19a is "a" as measured from the zero step is set at 50% as shown in FIG. 3C, and that the opening degree when the number of steps supplied to the step motor 19a is "b" is set at 70% as shown in FIG. 3D. In the instant embodiment, correspondence relationship between the number of steps and the opening degree is changed depending on the gas type used.

<Behavior of the Control Section>

FIG. 4 is a time chart explanatory of behavior of the control section 22 when starting by cranking has failed (i.e., at the time of a cranking failure), and FIG. 5 is a time chart explanatory of behavior of the control section 22 when starting by cranking has succeed and a shift is to be made to an operating or running state of the engine 12. FIGS. 4 and 5 each shows (a) cranking modes (Mode 1, Mode 2 and Mode 3), (b) output of the crank angle sensor 14, and (c) opening degrees of the flow rate control valve 19 (numbers of steps corresponding to small, medium and large opening degrees), (d) opening degrees of the flow rate control valve 19 at the time of next starting, and (e) output of the crank angle sensor 14 at the time of next starting.

The time chart of FIG. 4 shows, for each mode set by the control section 22, that three times of cranking are performed to control the starting of the engine 12. According to the illustrated example of FIG. 4, the control section 22 first performs three times of cranking, setting Mode 1 where the opening degree of the flow rate control valve 19 is relatively small such that the engine 12 can be started with relatively-high-calorie gas.

If it is confirmed that the starting of the engine 12 by the cranking in Mode 1 has failed without the number of rotations of the engine 12 reaching a reference value (i.e., number of idling rotations of the engine 12) despite the three times of cranking, the control section 22 recognizes that the gas calorie is too low, and then it performs further three times of cranking in Mode 2 where the medium opening degree is set. If the starting of the engine 12 by the cranking in Mode 2 has still failed, the control section 22 recognizes that the gas calorie is still too low, and then it performs further three times of cranking in Mode 3 where the large opening degree is set. Whereas the control section 22 has been described above as controlling the starting of the engine 12 by sequentially switching from the mode where the opening degree is relatively small over to the mode where the opening mode is relatively large in such a manner that the engine 12 can be started with relatively-high-calorie gas, the order of the cranking modes is not so limited and may be modified as desired. Further, the number of times of cranking to be performed per mode is not limited to three and may be set at any number necessary for starting of the engine 12 including a purge within the gas supply path 17.

FIG. 5 shows behavior of the control section 12 in a case where the number of rotations of the engine 12 has reached the idling rotations (complete explosion state) to succeed in the starting of the engine 12 at the third cranking in Mode 2. In this case, because the starting of the engine 12 has succeeded while Mode 2 is set, the mode in which the starting of the engine 12 has succeeded (i.e., Mode 2) is retained into the storage section 23 prior to the running of the engine 12, so that cranking can be started with thus-stored Mode 2 (i.e., mode where the opening degree is medium) at the time of next starting. In this way, the engine 12 can be started at an earlier time, and thus, a wait time required before the starting of the engine 12 can be significantly reduced, so that the output of the engine 12 can be supplied to the load at an earlier time.

Let it be assumed here that both the number of times of cranking and the number of rotations of the engine 12 are calculated by the control section 22 on the basis of angle information acquired from the angle sensor 14 mounted near the crank shaft of the engine 12.

Next, with reference to flow charts of FIGS. 6 and 7, a description will be given about the behavior of the control section 22 shown in FIG. 1.

Figure 6:
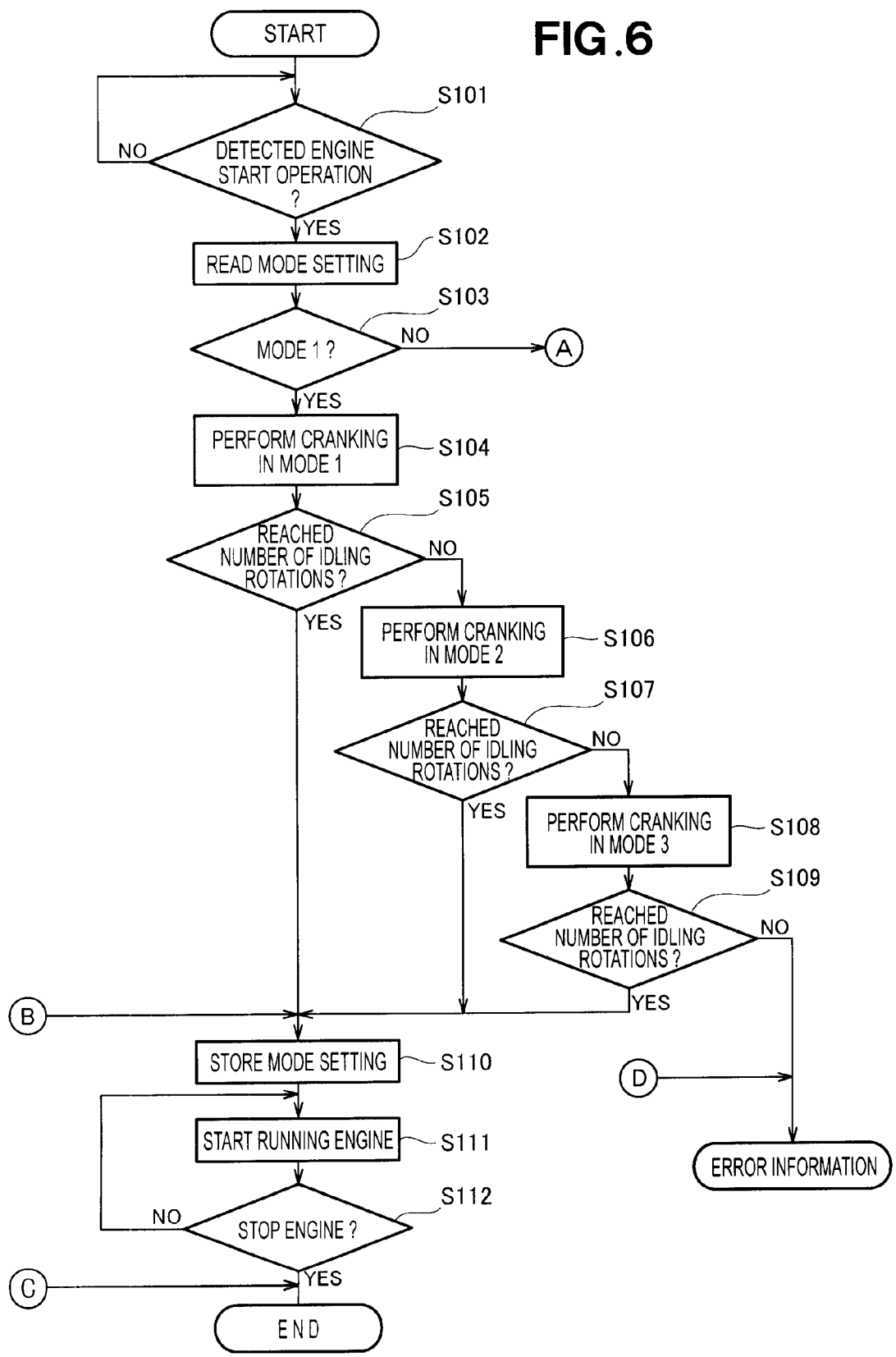
FIG. 6 is a flow chart showing a part of an operational sequence performed by the engine control device.

As shown in the flow chart of FIG. 6, the control section 22 is constantly monitoring arrival of an engine starting request made through user's operation (step S101). Let it be assumed here that, for the monitoring purpose, the control section 22 detects operation of a starting button (engine start operation) on the operation unit 35 of the heat load 32. Upon detection of the starting button operation (YES determination at step S101), the control section 22 reads out the cranking mode setting currently stored or retained in the storage section 23, at step S102. As clear from the forgoing, the cranking mode when the starting of the engine succeeded last is stored or retained in the storage section 23.

If the cranking mode setting currently stored or retained in the storage section 23 is Mode 1 where the starting of the engine 12 is to be attempted with the opening degree corresponding to the number of steps a of the step motor 19a (YES determination at step S103), then the control section 22 performs three times of cranking in Mode 1, at step S104. Then, the control section 22 determines, at step S105, whether the engine 12 has been started through the cranking and reached the number of idling rotations; in the instant embodiment, the number of idling rotations as the reference value is, for example, 800 rpm. For that purpose, the control section 22 acquires, via the crank angle sensor 14, information pertaining to an angle of the crankshaft (i.e., crank angle) to calculate the number of rotations of the engine 12 and determines a difference of the number of rotations of the engine 12 from the number of idling rotations.

If it is determined that the engine 12 has reached the number of idling rotations (YES determination at step S105), the control section 22 stores the current mode (i.e., Mode 1) into the storage section 23 at step S110 and shifts to the running state where, for example, hot water is supplied to the heat load 32 (step S111). The term "running state" as used herein means a state where, following the starting of the engine 12, the control section 22 is controlling the throttle valve 28 via the electric motor 27 in accordance with a load on the heat load 32. Then, upon arrival of an engine stop request (YES determination at step S112), the running of the engine 12 is terminated.

If, on the other hand, it is determined, in the number-of-idling-rotation determination operation of step S105, that the engine 12 has not yet arrived the number of idling rotations (NO determination at step S105), then the control section 22 performs, at step S106, three times of cranking in Mode 2 where it attempts the starting of the engine 12 with the opening degree corresponding to the number of steps b of the step motor 19a. Then, the control section 22 determines, at step S107, whether the engine 12 has been started through the cranking and reached the number of idling rotations.

If it is determined that the engine 12 has reached the number of idling rotations (YES determination at step S107), the control section 22 stores the current mode (i.e., Mode 2) into the storage section 23 at step S110 and shifts to the running state where, for example, hot water is supplied to the heat load 32 (step S111). If, on the other hand, it is determined that the engine 12 has not yet arrived the number of idling rotations (NO determination at step S107), then the control section 22 performs, at step S108, three times of cranking in Mode 3 where it attempts the starting of the engine 12 with the opening degree corresponding to the number of steps c of the step motor 19a.

Then, the control section 22 determines, at step S109, whether the engine 12 has been started through the cranking in Mode 3 and reached the number of idling rotations. If it is determined that the engine 12 has reached the number of idling rotations (YES determination at step S109), the control section 22 stores the current cranking mode (Mode 3) into the storage section 23 at step S110, and shifts to the running state where, for example, hot water is supplied to the heat load 32 (step S111). Then, upon arrival of an engine stop request (YES determination at step S112), the running of the engine 12 is terminated. On the other hand, if it is determined that the engine 12 has still not yet reached the number of idling rotations (NO determination at step S109), the control section 22 drives the informing section 24 to issue a signal indicative of an error (cranking failure) to the outside.

Figure 7:
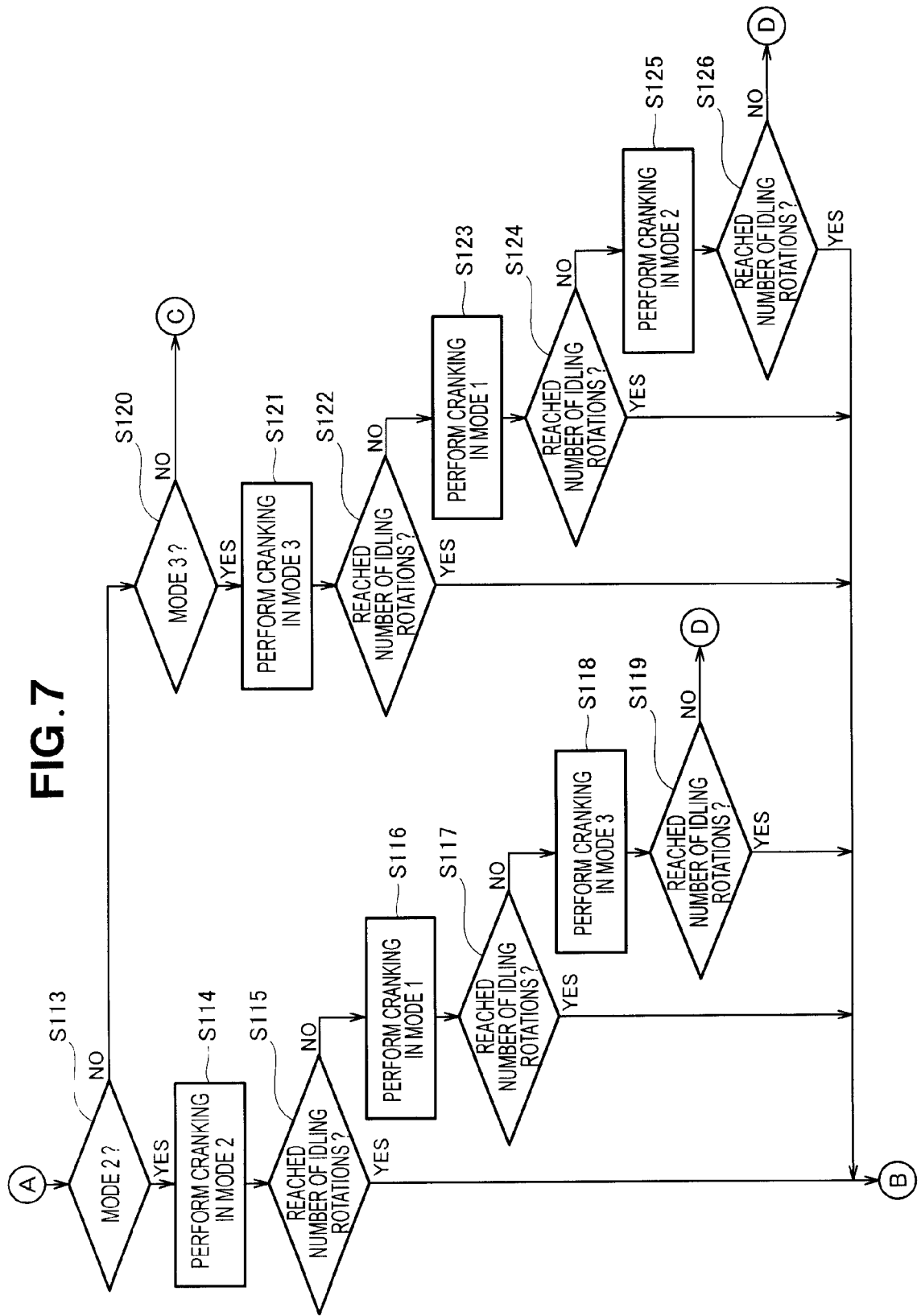
FIG. 7 is a flow chart showing the remaining part of the operational sequence performed by the engine control device.

If it is determined, in the Mode 1 determination operation of step S103, that Mode 1 is not currently stored or set in the storage section 23 (NO determination at step S103), the control section 22 further determines, at step S113 of FIG. 7, whether Mode 2 is currently stored or retained in the storage section 23. If Mode 2 is currently retained in the storage section 23 (YES determination at step S113), then the control section 22 performs three times of cranking according to Mode 2, at step S114. Then, the control section 22 determines, at step S115, whether the engine 12 has been started through the cranking and reached the number of idling rotations.

If it is determined that the engine 12 has reached the number of idling rotations (YES determination at step S115), the control section 22 stores the current cranking mode (Mode 2) into the storage section 23 at step S110, and shifts to the running state where, for example, hot water is supplied to the heat load 32 (step S111). Then, upon arrival of an engine stop request (YES determination at step S112), the running of the engine 12 is terminated.

If it is determined, in the number-of-idling-rotation determination operation of step S115, that the engine 12 has not yet reached the number of idling rotations (NO determination at step S115), the control section 22 performs, at step S116, three times of cranking in Mode 1 where it attempts the starting of the engine 12 with the opening degree corresponding to the number of steps a of the step motor 19a. Then, the control section 22 determines, at step S117, whether the engine 12 has been started through the cranking and reached the number of idling rotations.

If it is determined that the engine 12 has reached the number of idling rotations (YES determination at step S117), the control section 22 stores the current cranking mode setting (Mode 1) into the storage section 23 at step S110, and shifts to the running state where, for example, hot water is supplied to the heat load 32 (step S111). If, on the other hand, it is determined that the engine 12 has not yet arrived the number of idling rotations (NO determination at step S117), the control section 22 performs, at step S118, three times of cranking in Mode 3 where it attempts the starting of the engine 12 with the opening degree corresponding to the number of steps c of the step motor 19a.

If it is determined that the engine 12 has reached the number of idling rotations (YES determination at step S119), the control section 22 stores the current cranking mode setting (Mode 3) into the storage section 23 at step S110, and shifts to the running state where, for example, hot water is supplied to the heat load 32 (step S111). Then, upon arrival of an engine stop request (YES determination at step S112), the running of the engine 12 is terminated. Note that, if it is determined that the engine 12 has still not yet reached the number of idling rotations (NO determination at step S119), the control section 22 drives the informing section 24 to issue a signal indicative of an error (cranking failure) to the outside.

If it is determined, in the Mode 2 determination operation of step S113, that Mode 2 is not currently retained in the storage section 23 (NO determination at step S113), the control section 22 further determines, at step S120, whether Mode 3 is currently retained in the storage section 23. If Mode 3 is currently stored or set in the storage section 23 (YES determination at step S120), then the control section 22 performs three times of cranking according to Mode 3, at step S121. Then, the control section 22 determines, at step S122, whether the engine 12 has been started through the cranking and reached the reference number of idling rotations.

If it is determined that the engine 12 has reached the number of idling rotations (YES determination at step S122), the control section 22 stores the current cranking mode setting (Mode 3) into the storage section 23 at step S110, and shifts to the running state where, for example, hot water is supplied to the heat load 32 (step S111). Then, upon arrival of an engine stop request (YES determination at step S112), the running of the engine 12 is terminated.

If it is determined, in the number-of-idling-rotation determination operation of step S122, that the engine 12 has not yet reached the number of idling rotations (NO determination at step S122), the control section 22 performs, at step S123, three times of cranking in Mode 1 where it attempts the starting of the engine 12 with the opening degree corresponding to the number of steps a of the step motor 19a. Then, the control section 22 determines, at step S124, whether the engine 12 has been started through the cranking and reached the number of idling rotations.

If it is determined that the engine 12 has reached the number of idling rotations (YES determination at step S124), the control section 22 stores the current cranking mode setting (Mode 1) into the storage section 23 at step S110, and shifts to the running state where, for example, hot water is supplied to the heat load 32 (step S111). Then, upon arrival of an engine stop request (YES determination at step S112), the running of the engine 12 is terminated. If it is determined that the engine 12 has still not yet reached the number of idling rotations (NO determination at step S126), the control section 22 drives the informing section 24 to issue a signal indicative of an error (cranking failure) to the outside.

If none of Mode 1, Mode 2 and Mode 3 is currently stored or retained in the storage section 23 (NO determination at step S120), the aforementioned operational sequence pertaining to the engine starting control is brought to an end.

Figure 8A:
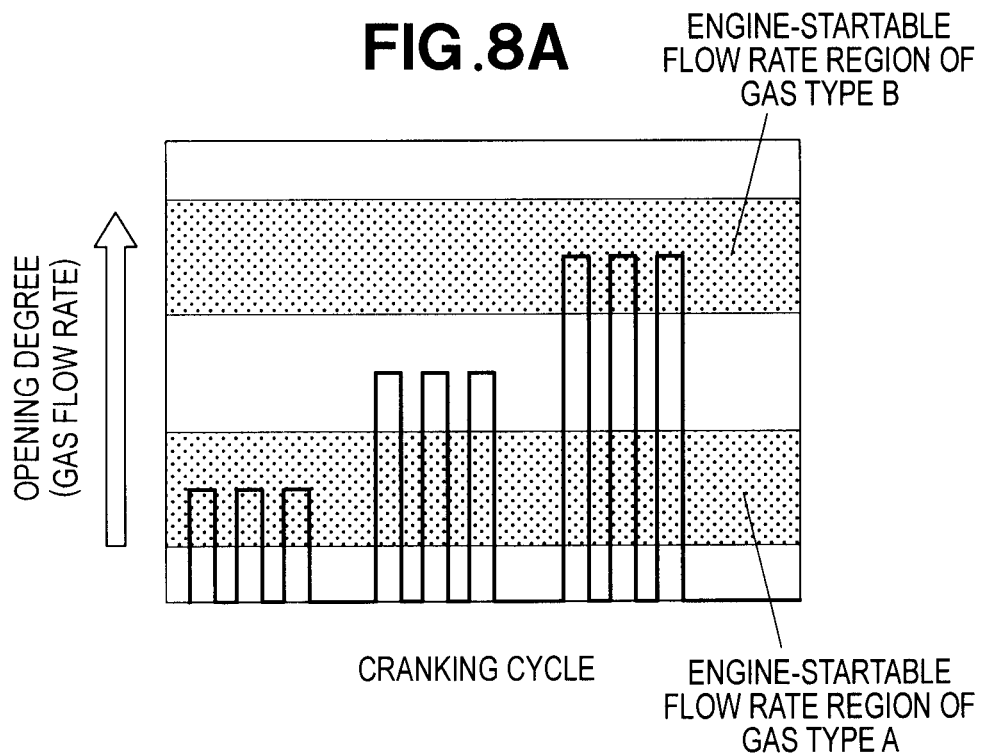
FIG. 8A is a diagram showing the embodiment of the engine control device employed in the cogeneration apparatus.
Figure 8B:
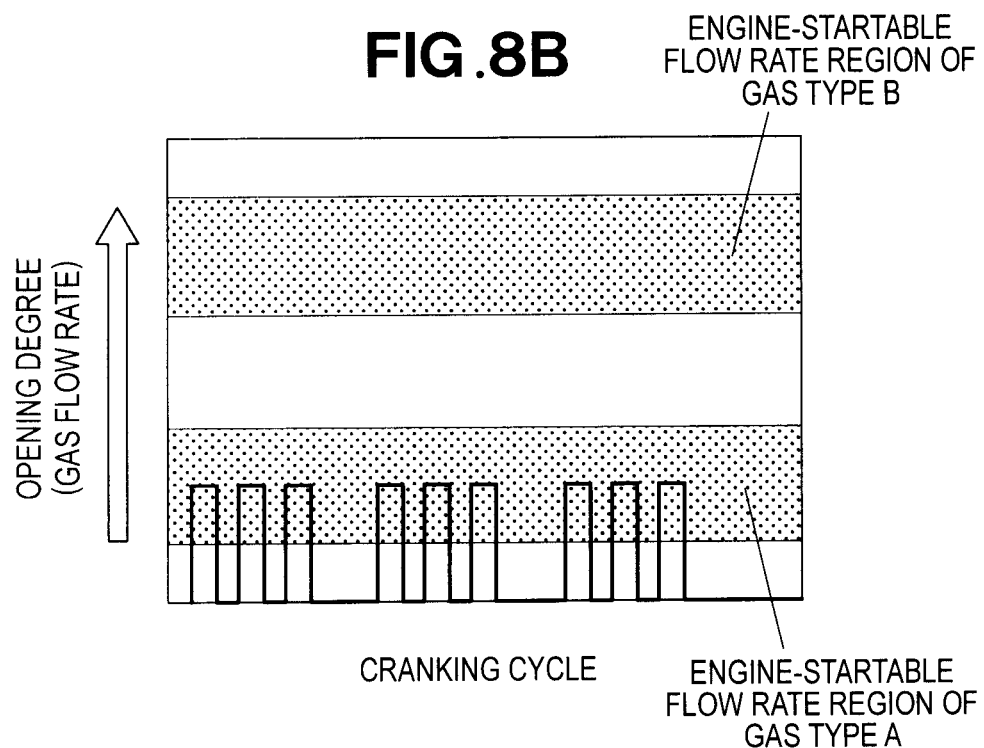
FIG. 8B is a diagram showing a conventional engine control device.

FIGS. 8A and 8B show a comparison between the embodiment of the engine control device 1 of the present invention and an engine control device employed in a conventionally-known cogeneration apparatus (i.e., conventional engine control device). More specifically, FIG. 8A shows the engine control device 1, while FIG. 8B shows the conventional engine control device. In each of FIGS. 8A and 8B, the vertical axis represents the opening degree (gas flow rate) while the horizontal axis represents the cranking cycle, and an upper shaded region represents an engine-startable flow rate region of gas type B while a lower shaded region represents an engine-startable flow rate region of gas type A. While the conventional engine control device was arranged to start the engine through cranking with the opening degree fixed such that an engine-startable flow rate is achieved for gas type A as shown in FIG. 8B, the embodiment of the engine control device 1 can start the engine 12 not only with gas type A but also with gas type B by variably controlling the opening degree as shown in FIG. 8A.

More specifically, even with gas types having different engine-startable fuel flow rate regions, the embodiment of the engine control device 1 can start the engine 12 when any one of the fuel flow rate regions is reached, by progressively variably setting the opening degree of the flow rate control valve 19 to thereby control the starting of the engine 12. For example, with gas type A, the engine 12 can be started through only three or less times of cranking, while, with gas type B, the engine 12 can be started through seven to nine times of cranking.

<Advantageous Benefits of the Embodiment>

According to the embodiment of the engine control device 1 of the present invention, cranking is started with the first opening degree upon detection of the first operation signal (engine start request), and running of the engine in the first mode corresponding to the first opening degree is started once the engine 12 reaches a predetermined number of rotations through a predetermined number of times of cranking. If the engine 12 has not yet reached the predetermined number of rotations, cranking is started with the second opening degree set, and the starting of the engine 12 is controlled by the engine control device detecting whether or not the engine 12 has reached the predetermined number of rotations. Thus, by setting the first opening degree or second opening degree depending on the gas type used, the engine control device 1 can advantageously permits the starting of the gas engine without depending on a particular gas type.

Further, upon detection of the second operation signal while the first mode is stored or retained in the storage section 23, the control section 22 starts cranking with the first opening degree in response to the second operation signal. Thus, the numbers of cranking to be attempted in the second mode and third mode can be reduced, so that the time necessary for the starting of the engine can be significantly reduced. Further, if the engine 12 has not yet reached the predetermined number of rotations through cranking in each of the first, second and third modes, the control section 22 informs of a cranking failure by means of the informing section 24. Thus, a human driver can recognize a failure of the starting of the engine 12 by looking at or listening to the informing section 24.

By applying the aforementioned engine control device, which permits starting of the gas engine without depending on a particular gas type, to the cogeneration apparatus, the present invention can not only supply electric power, generated in the power generator unit, to the electric load 31 in conjunction with the commercial power system, but also supply hot water or the like, produced using exhaust gas of the internal combustion engine (engine 12), to the heat load 32.

What is claimed is:

1. An engine control device for controlling starting of an engine, comprising:
    a needle valve assembly including a step motor having a motor shaft for undergoing a rotational movement, a plunger for undergoing a linear vertical movement converted from the rotational movement of the motor shaft, and a needle valve body, the needle valve body having a needle disposed on the plunger, and an orifice, the needle and the orifice defining an opening therebetween, the opening having an opening degree variable to one of a plurality of opening degrees including a first opening degree provided by the opening being opened by 50% and a second opening degree provided by the opening being opened by 70%, the needle being operable in response to the linear vertical movement of the plunger to vary the opening degree for adjusting a flow rate of gas to mix with an air into a fuel-air mixture to be supplied to the engine;
    a control section connected to the needle valve assembly for controlling the needle valve assembly to set the opening degree of opening, the control section being configured to start, upon detection of a first operation signal, a predetermined number of times or less of cranking with the opening degree set by the control section to the first opening degree in accordance with the first operation signal, and start, if a number of rotations of the engine has not yet reached a predetermined value through the cranking with the opening degree set to the first opening degree, the predetermined number of times or less of cranking with the opening degree set by the control section to the second opening degree,
    wherein the plurality of opening degrees further includes a third opening degree larger than the second opening degree, and the control section is operable to start the predetermined number of times or less of cranking with the opening degree set to the third opening degree if after varying the opening degree from the second opening degree back to the first opening degree the number of rotations of the engine has not yet reached the predetermined value through the cranking with the opening degree set to the first opening degree; and
    a shut-off valve connected to the needle valve assembly and the control section to be controlled by the control section to open for a predetermined period of time to allow supply of gas from a fuel supply source to the needle valve assembly during the predetermined number of times or less of cranking.

2. The engine control device of claim 1, further comprising a storage section, wherein, when the number of rotations of the engine has reached the predetermined value through the predetermined number of times or less of cranking with the first or second opening degree, a first or second mode corresponding to the first or second opening degree is stored into the storage section.

3. The engine control device of claim 2, wherein, upon detection of a second operation signal while the first mode is retained in the storage section, the control section starts the cranking in accordance with the first opening degree.

4. The engine control device of claim 2, wherein, upon detection of a second operation signal while the second mode is retained in the storage section, the control section starts the cranking with the second opening degree in accordance with the second operation signal.

5. The engine control device of claim 1, further comprising an informing section, wherein, when the number of rotations of the engine has not reached the predetermined value through the predetermined number of times or less of cranking in each of the first and second modes, the control section informs of a cranking failure by means of the informing section.

6. A cogeneration apparatus including an engine control device for controlling starting of an engine, comprising:
    a needle valve assembly including a step motor having a motor shaft for undergoing a rotational movement, a plunger for undergoing a linear vertical movement converted from the rotational movement of the motor shaft, and a needle valve body, the needle valve body having a needle disposed on the plunger, and an orifice, the needle and the orifice defining an opening therebetween, the opening having an opening degree variable to one of a first opening degree provided by the opening being opened by 50% and a second opening degree provided by the opening being opened by 70%, the needle being operable in response to the linear vertical movement of the plunger to vary the opening degree for adjusting a flow rate of gas to mix with an air into a fuel-air mixture to be supplied to the engine;
    a control section connected to the needle valve assembly for controlling the needle valve assembly to set the opening degree of the opening, the control section being configured to start, upon detection of a first operation signal, a predetermined number of times or less of cranking with the opening degree of the needle valve assembly set by the control section to the first opening degree in accordance with the first operation signal, and start, if a number of rotations of the engine has not yet reached a predetermined value through the cranking with the opening degree set to the first opening degree, the predetermined number of times or less of cranking with the opening degree of the needle valve assembly set by the control section to the second opening degree,
    wherein the plurality of opening degrees further includes a third opening degree larger than the second opening degree, and the control section is configured to start the predetermined number of times or less of cranking with the opening degree of the needle valve assembly set by the control section to the third opening degree if after varying the opening degree from the second opening degree back to the first opening degree the number of rotations of the engine has not yet reached the predetermined value through the cranking with the opening degree set to the first opening degree; and a shut-off valve connected to the needle valve assembly and the control section to be controlled by the control section to open for a predetermined period of time to allow supply of gas from a fuel supply source to the needle valve assembly during the predetermined number of times or less of cranking.

7. The cogeneration apparatus of claim 6, wherein said engine control device further comprising a storage section, wherein, when the number of rotations of the engine has reached the predetermined value through the predetermined number of times or less of cranking with the first or second opening degree, a first or second mode corresponding to the first or second opening degree is stored into the storage section.

8. The cogeneration apparatus of claim 7, wherein, upon detection of a second operation signal while the first mode is retained in the storage section, the control section starts the cranking in accordance with the first opening degree.

9. The cogeneration apparatus of claim 7, wherein, upon detection of a second operation signal while the second mode is retained in the storage section, the control section starts the cranking with the second opening degree in accordance with the second operation signal.

10. The cogeneration apparatus of claim 6, wherein said engine control device further comprising an informing section, wherein, when the number of rotations of the engine has not reached the predetermined value through the predetermined number of times or less of cranking in each of the first and second modes, the control section informs of a cranking failure by means of the informing section.

11. The engine control device of claim 1, wherein the control section is operable to start the predetermined number of times or less of cranking with the opening degree set to the third opening degree if the number of rotations of the engine has not yet reached the predetermined value through the cranking with the opening degree set to the second opening degree.

12. A method for controlling starting of an engine, comprising:

providing a flow rate control valve having an opening degree variable to adjust a flow rate of gas to mix with an air into a fuel-air mixture to be supplied to the engine, and a storage section storing one mode of:
  a first mode in which the opening degree of the flow rate control valve is set to a first opening degree;
  a second mode in which the opening degree of the flow rate control valve is set to a second opening degree larger than the first opening degree; and
  a third mode in which the opening degree of the flow rate control valve is set to a third opening degree larger than the second opening degree;
electronically retrieving the one mode stored in the storage section;
determining whether the one mode stored in the storage section is the first mode;
if the one mode stored in the storage section is the first mode, performing:
  attempting to start the engine in the first mode;
  determining whether a number of rotations of the engine has reached a number of idling rotations in the first mode;
  if the number of rotations of the engine has not reached the number of idling rotations in the first mode, varying the opening degree from the first opening degree to the second opening degree to attempt to start the engine in the second mode;
  determining whether the number of rotations of the engine has reached the number of idling rotations in the second mode after varying the opening degree from the first opening degree to the second opening degree to attempt to start the engine in the second mode;
  if the number of rotations of the engine has reached the number of idling rotations in the second mode after varying the opening degree from the first opening degree to the second opening degree to attempt to start the engine in the second mode, storing the second mode in the storage section;
  if the number of rotations of the engine has not reached the number of idling rotations in the second mode after varying the opening degree from the first opening degree to the second opening degree to attempt to start the engine in the second mode, varying the opening degree from the second opening degree to the third opening degree to attempt to start the engine in the third mode;
  determining whether the number of rotations of the engine has reached the number of idling rotations in the third mode after varying the opening degree from the second opening degree to the third opening degree to attempt to start the engine in the third mode;
  if the number of rotations of the engine has reached the number of idling rotations in the third mode after varying the opening degree from the second opening degree to the third opening degree to attempt to start the engine in the third mode, storing the third mode in the storage section;
  if the number of rotations of the engine has not reached the number of idling rotations in the third mode after varying the opening degree from the second opening degree to the third opening degree to attempt to start the engine in the third mode, informing a failure to start the engine;
if the one mode stored in the storage section is not the first mode, determining whether the one mode stored in the storage section is the second mode;
if the one mode stored in the storage section is the second mode, performing:
  attempting to start the engine in the second mode;
  determining whether the number of rotations of the engine has reached the number of idling rotations in the second mode;
  if the number of rotations of the engine has reached the number of idling rotations in the second mode, storing the second mode in the storage section;
  if the number of rotations of the engine has not reached the number of idling rotations in the second mode, varying the opening degree from the second opening degree to the first opening degree to attempt to start the engine in the first mode;
  determining whether the number of rotations of the engine has reached the number of idling rotations in the first mode after varying the opening degree from the second opening degree to the first opening degree to attempt to start the engine in the first mode;
  if the number of rotations of the engine has reached the number of idling rotations in the first mode after varying the opening degree from the second opening degree to the first opening degree to attempt to start the engine in the first mode, storing the first mode in the storage section;

if the number of rotations of the engine has not reached the number of idling rotations in the first mode after varying the opening degree from the second opening degree to the first opening degree to attempt to start the engine in the first mode, varying the opening degree from the first opening degree to the third opening degree to attempt to start the engine in the third mode;

determining whether the number of rotations of the engine has reached the number of idling rotations in the third mode after varying the opening degree from the first opening degree to the third opening degree to attempt to start the engine in the third mode;

if the number of rotations of the engine has reached the number of idling rotations in the third mode after varying the opening degree from the first opening degree to the third opening degree to attempt to start the engine in the third mode, storing the third mode in the storage section; and if the number of rotations of the engine has not reached the number of idling rotations in the third mode after varying the opening degree from the first opening degree to the third opening degree to attempt to start the engine in the third mode, informing a failure to start the engine.

13. The method of claim 12, further comprising:

regulating air for the fuel-air mixture using a throttle valve driven by an electric motor, the electric motor independent of operation of adjusting the flow rate of the gas.

14. The method of claim 12, further comprising:

if the one mode stored in the storage section is neither the first mode nor the second mode, determining whether the one mode stored in the storage section is the third mode;

if the one mode stored in the storage section is the third mode, attempting to start the engine in the third mode;

determining whether the number of rotations of the engine has reached the number of idling rotations in the third mode;

if the number of rotations of the engine has reached the number of idling rotations in the third mode, storing the third mode in the storage section;

if the number of rotations of the engine has not reached the number of idling rotations in the third mode, setting the opening degree to the first opening degree to attempt to start the engine in the first mode;

determining whether the number of rotations of the engine has reached the number of idling rotations in the first mode;

if the number of rotations of the engine has reached the number of idling rotations in the first mode, storing the first mode in the storage section;

if the number of rotations of the engine has not reached the number of idling rotations in the first mode, setting the opening degree to the second opening degree to attempt to start the engine in the second mode;

determining whether the number of rotations of the engine has reached the number of idling rotations in the second mode;

if the number of rotations of the engine has reached the number of idling rotations in the second mode, storing the second mode in the storage section; and if the number of rotations of the engine has not reached the number of idling rotations in the second mode, informing a failure to start the engine.

15. The engine control device of claim 1, comprising a throttle valve driven by an electric motor, the throttle valve regulating air for the fuel-air mixture and the electric motor being operable independently from operation of the step motor.

16. The cogeneration apparatus of claim 6, wherein air for the fuel-air mixture is regulated by a throttle valve driven by an electric motor, the electric motor being operable independently from operation of the step motor.

* * * * *